Feb. 2, 1965 L. E. LINT 3,168,313
HUNTING ARROWHEAD WITH RETRACTABLE BARBS
Filed March 28, 1962
FIG.1
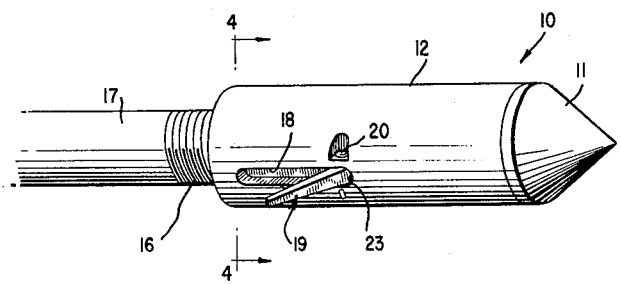

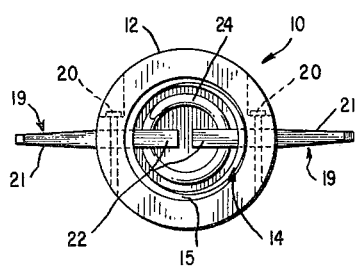
FIG.4
*INVENTOR.*
LEWIS E. LINT
BY *Rudolph R. Lowell*
*ATTORNEY*

… … …

United States Patent Office 3,168,313
Patented Feb. 2, 1965

3,168,313
HUNTING ARROWHEAD WITH
RETRACTABLE BARBS
Lewis E. Lint, R.R. 4, Winterset, Iowa
Filed Mar. 28, 1962, Ser. No. 183,141
3 Claims. (Cl. 273—106.5)

This invention relates to arrowhead structures generally and more particularly to an improved arrowhead which may be interchangeably employed for both target and hunting arrows.

The sport of archery includes a broad field of endeavor wherein archery equipment of various types is utilized for a wide variety of purposes. Among these are field shooting, hunting, target practice, fishing and many others, but these various applications of archery equipment may be broadly categorized under the general headings of target usage and hunting usage.

The archery equipment employed for hunting must be specially designed to meet the particular requirements involved in this phase of archery, and therefore, this equipment differs in construction from that designed for target uses. These differences are particularly apparent in arrowhead design, for the hunting arrowhead is normally provided with with laterally projecting barbs which penetrate the flesh of an animal and operate to prevent the disengagement of the arrowhead by the animal. Conversely, the target arowhead is normally smooth and streamlined in configuration so that the trajectory of the arrow in flight will not be altered by the action of air currents operating upon irregular arrowhead surfaces.

The projecting barbs of the hunting arrowhead render the hunting arrow unsuitable for target use and also present a hazard to arrow handlers. In the past, hunting arrowheads have been designed with pivoted barbs so that the barbs could be encased within the arrowhead prior to use to prevent injury to arrow handlers. These previous designs have included barbs which are held in an open or laterally projecting position by contact with a portion of the arrow shaft when the arrowhead is threaded upon the shaft, barbs held in a laterally projecting position by a special collar provided upon the shaft, barbs which are automatically thrust open by contact with a moving shaft when the arrowhead enters the body of an animal, and barbs which are opened by contact with the body of an animal. Although many of these prior arrowhead constructions provide devices for positively holding the pivoted barbs of a hunting arrowhead in an open or laterally projecting position, none of these devices effectively provide means to lock the pivoted barbs of a hunting arrowhead in a retracted position or to forcibly close the barbs of a hunting arrow after the arrow has entered the body of an animal. This latter feature would be most advantageous if employed in a hunting arrowhead construction, as the barbs of a hunting arrowhead act to prevent the removal of the arrrowhead after it has become embedded in the flesh of an animal. Often hunting arrowheads including pivoted barbs cause damage to the flesh of an animal before the arrowhead can be withdrawn, as these arrowheads are provided with no means for forcibly retracting the barbs while the arrowhead is embedded within the animal. Also, prior hunting arrowheads employing pivoted barbs have proved unsuitable for target use, as no means are provided for effectively locking the barbs in a retracted position. With prior arrowheads, the barbs were often forced from the retracted position during target use by rapid accelerations or the severe impacts experienced by the arrowhead. The extended barbs adversely affect the extreme accuracy required for target archery, and therefore have rendered the hunting arrowhead with pivoted barb units unsuitable for target use.

It is a primary object of this invention to provide an improved arrowhead which may be intechangeably employed with both target and hunting arrows.

Another object of this invention is to provide an improved arrowhead which is provided with retractable barb units.

A further object of this invention is to provide an improved arrowhead provided with retractable barb units and means for forcibly retracting and locking the barbs in a position below the surface of the arrowhead.

A still further object of this invention is to provide an improved arrowhead of inexpensive construction which may be easiy removed from an arrow shaft.

With the foregoing and other objects in view, the invention resides in the following specification and appended claims, certain details of construction of which are illustrated in the accompanying drawings, in which:

FIGURE 1 is a perspective view of the arrowhead of the present invention attached to an arrow shaft;

FIGURE 4 is a cross-section taken along lines 4—4 of FIGURE 1 of the arrowhead of the present invention detached from the arrow shaft.

Figure 2:
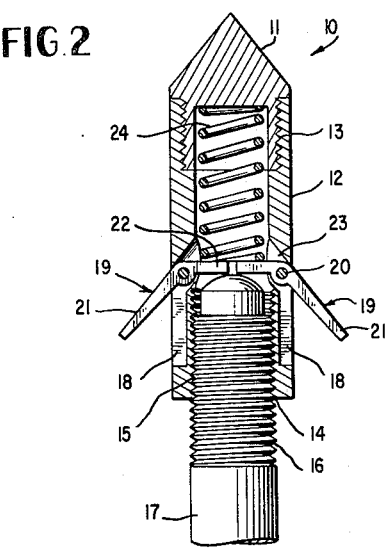
FIGURE 2 is a partially sectioned plan view of the arrowhead of the subject invention with the barbs in an extended position.

Referring now to the drawings, the arrowhead of the present invention indicated generally at 10 includes a forward or pointed tip portion 11 and a body portion 12. The tip portion 11 may be removably attached to the body portion 12, as indicated at 13 in FIGURES 2 and 3, or the tip may be integrally secured to the body 12. The body 12 is of a generally tubular shape and is provided with a bore 14 which is internally threaded as indicated at 15. The threads 15 of the bore 14 engage with threads 16 provided upon one end of an arrow shaft 17.

The tubular body 12 of the arrowhead 10 is provided with two longitudinally extending slots or depressions 18 which are oppositely disposed at either side of the body 12. A barb 19 is contained in each of the slots 18 and is pivoted to the tubular body 12 by means of a pivot pin 20. Each of said barbs 19 includes an outer barb portion 21 which projects outwardly and rearwardly of the arrowhead body 12 when the barbs 19 are in the open position as illustrated by FIGURE 2. Outer barb portions 21 extend angularly from the inner barb ends 22 which project through the forward portions 23 of the slots 18 into the bore 14 of the tubular body 12. With the barbs 19 in the open position of FIGURE 2, the inner barb ends 22 extend into the bore 14 in a plane substantially perpendicular to the longitudinal axis of the arrowhead 10. A spring 24 is provided within the bore 14 of the body 12 and extends between the tip portion 11 of the arrowhead 10 and the forward surface of the transversely extending inner barb portions 22. This spring operates to bias the barbs 19 in the open position illustrated by FIGURE 2.

In the operation of the arrowhead 10, when the shaft 17 is retracted away from the inner barb portions 22 of the barbs 19, the spring 24 acts to hold the barbs 19 in the open position of FIGURE 2. Under these circumstances, the arrowhead is in condition for hunting live game, and when the arrowhead 10 penetrates the flesh of an animal, the initial impact on the outer portions 21 of the barbs 19 causes the barbs to be retracted into the slots 18 against the bias of the spring 24. After the arrowhead 10 has completely penetrated the flesh of an animal, the spring 24 forces the barbs 19 outwardly so as to retain the arrowhead within the animal. To remove the arrowhead from the animal, the barbs may be again retracted by threading the shaft 17 into the bore 14 until the shaft contacts the outer surfaces of the inner barb portions 22. When this contact occurs, further inward threading of the shaft within the bore 14 will cause the barbs 19 to be retracted within the slots 18, as illustrated by FIGURE 3.

Figure 3:
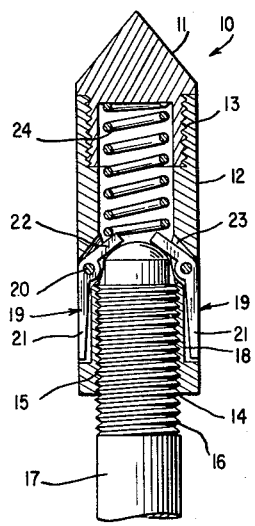
FIGURE 3 is a partially sectioned plan view of the arrowhead of the present invention with the barbs locked in a retracted position.

If it becomes desirable to utilize the arrowhead 10 for target practice, the shaft 17 is threaded into the bore 14 of the body 12 so that the engagement of the shaft with the inner barb ends 22 of the barbs 19 causes the barbs to be retracted within the slots 18, as illustrated by FIGURE 3. It will be noted that when the shaft 17 is in the position indicated by FIGURE 3, that the barbs 19 are positively locked in the retracted position and may not be jarred to the extended position of FIGURE 2 by impacts experienced by the arrowhead 10. Thus, the arrowhead 10 is quite suitably adapted for target usage.

It will be readily apparent to those skilled in the art that the present invention provides a novel and improved arrowhead which is readily adaptable for both target and hunting purposes. The arrangements and types of components described herein may be subject to numerous modifications well within the purview of this inventor who intends only to be limited to a liberal interpretation of the specification and appended claims.

I claim:

1. An arrowhead adapted to be removably attached to an arrow shaft comprising:
   (a) a substantially cylindrical body having a central bore extending through said body, and oppositely disposed longitudinal slots in the outer surface thereof open to said bore, and said bore being internally threaded to receive said shaft and permit longitudinal movement of the shaft relative to said body,
   (b) a pointed tip removably secured to the end of said body opposite the shaft,
   (c) barb members disposed in each of said longitudinal slots and having an inner end section and an outer end section, the outer end sections being movable from retracted positions in said slots to positions extended laterally of said body, the inner end sections extended within said bore and engageable with said shaft, said engagement causing upon movement of the shaft into the body the barb members to move from said extended to said retracted positions,
   (d) means pivotally connecting the barb members intermediate the end sections thereof to the body, and
   (e) spring means extended within said body in engagement with said tip and said inner end section of each barb member, said spring means acting to pivot said barb members to move the outer end sections thereof to said laterally extended positions.

2. The arrowhead defined in claim 1 wherein:
   (a) each barb member has an angular shape defining an apex section to which the pivot means is operably connected.

3. An arrow comprising:
   (a) an arrowhead having a body member with a pointed tip end and a central bore extended partially through said body member from the end opposite said tip end, said bore having the side wall thereof formed with a longitudinally extended slot,
   (b) an arrow shaft having one end thereof receivable within said bore for movement longitudinally thereof to first and second positions,
   (c) coacting means on said body member and said one end of the arrow shaft for selectively holding said arrow shaft in said first and second positions therefor,
   (d) a pivoted barb member in said slot having an inner end section and an outer end section, the outer end section being movable from a retracted position within the slot to a position extended laterally outwardly from said body member, and the inner end section being projected within said bore for engagement with said one end of the arrow shaft,
   (e) means pivotally connecting the barb member intermediate the end sections thereof to said body member, and
   (f) biasing means within said bore in contact with the inner section of the barb member acting to pivot the outer end section of the barb member to said laterally extended position therefor, the arrow shaft on movement to the first position therefor acting to move the outer end section of the barb member to the retracted position therefor, and on movement to the second position therefor permitting said biasing means to move the outer end section of the barb member to the laterally extended position therefor.

References Cited by the Examiner

UNITED STATES PATENTS

| | | |
|---|---|---|
| 2,806,317 | 9/57 | Minisini. |
| 2,939,708 | 6/60 | Scheib _____ 273—106.5 |
| 3,014,305 | 12/61 | Yurchich _____ 273—106.5 X |
| 3,036,395 | 5/62 | Nelson _____ 43—6 |
| 3,036,396 | 5/62 | Swails _____ 43—6 |

DELBERT B. LOWE, *Primary Examiner.*